(12) United States Patent
Zhang

(10) Patent No.: US 8,700,814 B2
(45) Date of Patent: Apr. 15, 2014

(54) INTELLIGENT BUS ADDRESS SELF-CONFIGURATION IN A MULTI-MODULE SYSTEM

(75) Inventor: Wei Zhang, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 233 days.

(21) Appl. No.: 12/822,476

(22) Filed: Jun. 24, 2010

(65) Prior Publication Data

US 2011/0289237 A1 Nov. 24, 2011

(30) Foreign Application Priority Data

May 18, 2010 (CN) .......................... 2010 1 0176797

(51) Int. Cl.
*G06F 3/00* (2006.01)

(52) U.S. Cl.
USPC ........ 710/9; 710/10; 710/11; 710/12; 710/13; 710/14

(58) Field of Classification Search
None
See application file for complete search history.

(56) References Cited

U.S. PATENT DOCUMENTS

| | | | | |
|---|---|---|---|---|
| 4,730,251 A | * | 3/1988 | Aakre et al. .................. | 710/104 |
| 5,404,460 A | * | 4/1995 | Thomsen et al. .................. | 710/9 |
| 5,475,854 A | * | 12/1995 | Thomsen et al. ............... | 710/23 |
| 5,551,053 A | * | 8/1996 | Nadolski et al. .................. | 710/9 |
| 5,675,830 A | * | 10/1997 | Satula ............................. | 710/9 |
| 5,758,182 A | | 5/1998 | Rosenthal et al. | |
| 5,787,306 A | * | 7/1998 | Michael ............................. | 710/9 |
| 5,914,957 A | * | 6/1999 | Dean et al. ..................... | 370/438 |
| 6,141,741 A | | 10/2000 | Priem et al. | |
| 6,738,920 B1 | * | 5/2004 | Horne ............................ | 713/500 |
| 6,850,992 B2 | * | 2/2005 | Heinrich et al. .................. | 710/3 |
| 7,328,286 B2 | * | 2/2008 | Vinnemann ....................... | 710/9 |
| 7,565,470 B2 | * | 7/2009 | Lin ................................. | 710/110 |
| 7,827,249 B2 | * | 11/2010 | Lin ................................. | 709/208 |

(Continued)

FOREIGN PATENT DOCUMENTS

| | | |
|---|---|---|
| DE | 3736081 | 5/1989 |
| DE | 19756564 | 6/1998 |

(Continued)

OTHER PUBLICATIONS

Extended European Search Report dated Jul. 29, 2011 issued in related European Patent Application No. 11166597.2-2416.

(Continued)

*Primary Examiner* — Henry Tsai
*Assistant Examiner* — Jing-Yih Shyu
(74) *Attorney, Agent, or Firm* — Pillsbury Winthrop Shaw Pittman LLP

(57) ABSTRACT

An apparatus includes a first module including a bus port for coupling the first module to a bus; a first configuration port receiving an input indicating whether address assignment is enabled/disabled for the first module; a second configuration port providing an output indicating whether address assignment is enabled/disabled for a second module; a memory to store a unique address, wherein the unique address identifies the first module; and a controller coupled to a central management unit (CMU) via the bus, the controller to receive the unique address from the CMU, determine whether address assignment is enabled for the first module and store the unique address in the memory if address assignment is enabled, enable/disable address assignment for a second module when the second module is coupled to the first module, and the controller to enable/disable address assignment for the second module based on a message from the CMU.

18 Claims, 2 Drawing Sheets

(56) References Cited

U.S. PATENT DOCUMENTS

| | | | |
|---|---|---|---|
| 8,010,709 B2 * | 8/2011 | Pyeon et al. | 710/8 |
| 8,010,710 B2 * | 8/2011 | Sumi | 710/8 |
| 8,010,714 B2 * | 8/2011 | Simon | 710/9 |
| 8,271,758 B2 * | 9/2012 | Pyeon et al. | 711/170 |
| 2006/0088044 A1 * | 4/2006 | Hammerl | 370/402 |

FOREIGN PATENT DOCUMENTS

| | | |
|---|---|---|
| EP | 1653363 | 5/2006 |
| JP | H04242339 A | 8/1992 |
| JP | H1091219 A | 4/1998 |
| JP | 2005277913 A | 10/2005 |
| JP | 2007126055 A | 5/2007 |
| JP | 2011120167 A | 6/2011 |

OTHER PUBLICATIONS

Japanese Office Action dated Jun. 11, 2013 issued in JP 2011-169922.

* cited by examiner

INTELLIGENT BUS ADDRESS SELF-CONFIGURATION IN A MULTI-MODULE SYSTEM

BACKGROUND

A plurality of modules may be coupled to a bus. In order to individually access each of the plurality of modules, each module should have a unique identifier, i.e., address. In some cases, the modules may be initially manufactured identically with added process step(s) to set an individual address for each module. For example, an array of switches may be used to set an address for a module. In another example, each resistor in an array of resistors may be coupled to VCC (e.g., a positive voltage supply) or VSS (e.g., ground or a negative voltage supply) to provide an address for a module. In another example, the address of the module may be stored in memory prior to coupling the module to the bus.

In all of the these examples, the addresses are set at manufacturing or, at least, individually, prior to coupling the modules to a bus. Manufacturing costs may be increased because of the additional step(s). Further, modules with individual addresses set must be individually identified so two modules with the same address are not connected to the same bus. This may add to the cost of inventory as well as including a risk of two modules with the same address being connected to the bus. In these examples, changing a module's address typically requires direct access to the module, making maintenance and system expansion difficult.

It is desirable for each module to be manufactured identically to each other module, providing savings in both manufacturing cost and time. In operation, however, it is desirable to individually access each module using, e.g., a unique address for each module.

SUMMARY

According to one aspect there is disclosed an apparatus. The apparatus may include a first module including at least one bus port configured to couple the first module to a bus; a first configuration port configured to receive an input indicating whether address assignment is enabled or disabled for the first module; a second configuration port configured to provide an output indicating whether address assignment is enabled or disabled for a second module; a memory configured to store a unique address, wherein the unique address is configured to identify the first module; and a controller configured to be coupled to a central management unit via the bus, the controller further configured to receive the unique address from the central management unit, determine whether address assignment is enabled for the first module and to store the unique address in the memory if address assignment is enabled for the first module, enable or disable address assignment for a second module when the second module is coupled to the first module, and the controller further configured to enable or disable address assignment for the second module based, at least in part, on a message from the central management unit.

According to another aspect there is disclosed a method for assigning unique addresses to a plurality of modules. The method may include disabling address assignment for the plurality of modules wherein the plurality of modules are coupled to a bus, the plurality of modules includes a first module coupled to a second module and the plurality of modules are identified by an initial address. The method may further include enabling address assignment for the first module; storing a new address in the first module; disabling address assignment for the first module; and enabling address assignment for the second module In yet another aspect there is disclosed a system. The system may include a plurality of modules coupled to a bus, the plurality of modules includes a first module coupled to a second module, the first module includes at least one bus port configured to couple the first module to the bus; a first configuration port configured to receive an input indicating whether address assignment is enabled or disabled for the first module; a second configuration port configured to provide an output indicating whether address assignment is enabled or disabled for a second module; a memory configured to store a unique address, wherein the unique address is configured to identify the first module; and a controller configured to receive the unique address, determine whether address assignment is enabled for the first module and to store the unique address in the memory if address assignment is enabled for the first module, enable or disable address assignment for the second module. The system may further include a central management unit coupled to the bus, the central management unit is configured to provide the unique address to the controller, the central management unit is further configured to provide a message to the controller, wherein the message is configured to cause the controller to enable or disable address assignment for the second module; wherein the controller is further configured to enable or disable address assignment for the second module based, at least in part, on the message from the central management unit.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

A system, apparatus and/or method consistent with the present disclosure is configured to assign unique addresses to a plurality of modules coupled to a bus. The system, apparatus and method may be configured to assign an address to a new module coupled to the bus after the initial address assignment, e.g. "hot-swapping" module(s). Each module is configured to be coupled to the bus and to a central management unit via the bus. Each module is further configured to be coupled to at least one other module. For example, a first module is configured to be coupled to a second module.

Figure 1:
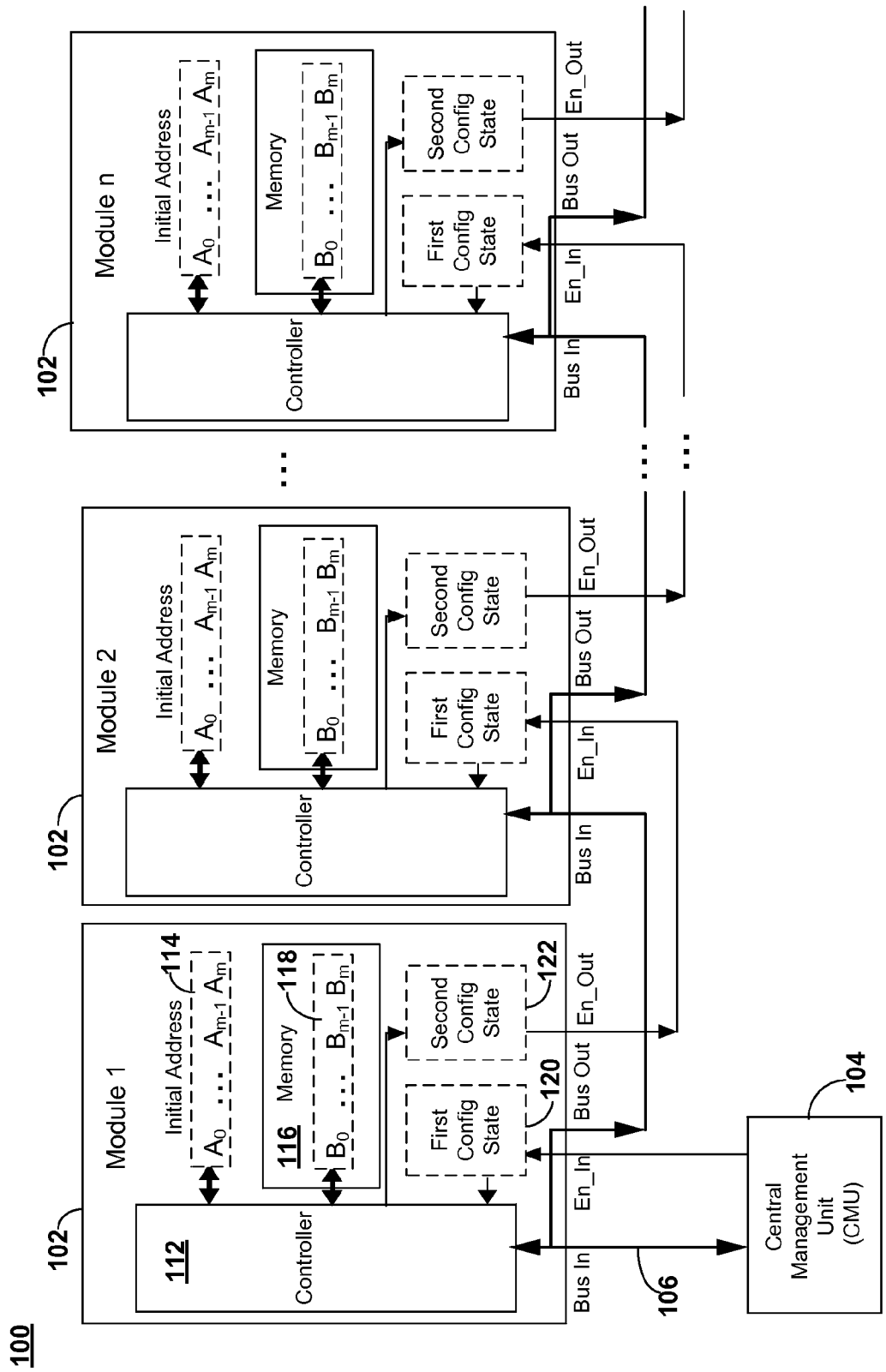
FIG. 1 depicts a block diagram of a system consistent with the present disclosure.

FIG. 1 depicts a block diagram of one embodiment of a system 100, including circuitry, consistent with the present disclosure. The system 100 includes a plurality of modules. Each module 102 includes module circuitry. For example, system 100 may include a plurality of modules: Module 1, Module 2, . . . , Module n. For ease of description, a specific module is referred to herein as "Module x" where x is 1, 2 or n, and an individual module that may be any of the plurality of modules is referred to herein as "module 102". Each module 102 is configured to be coupled to a bus 106. The system 100 may further include central management unit (CMU) circuitry 104 coupled to the bus 106. Accordingly, each module is coupled to each other module and the CMU 104 via the bus 106. The CMU 104 may be coupled to a module 102 without bus 106 between the CMU 104 and the module 102. For example, the CMU 104 may be coupled to Module 1. Each module 102 may be coupled to at least one other module without going through the bus 106. For example, Module 1 may be coupled to Module 2.

The bus 106 is configured to provide communication between the CMU 104 and each module 102 and/or between two or more modules 102. The bus 106 may be a serial bus configured for serial communication. For example, the bus may be CAN ("Controller Area Network"), I²C ("Inter-Integrated Circuit"), SPI ("Serial Peripheral Interface"), RS485 (EIA-485, TIA/EIA-485, "Telecommunications Industry Association/Electronics Industry Association" Standard), UART ("Universal Asynchronous Receiver/Transmitter"), and/or another bus technology as may be known to those skilled in the art. One or more messages may be communicated between the CMU 104 and one or more of the modules 102 and/or between two or more modules 102 using bus 106. A message may include commands, e.g., instructions, identifier(s) and/or data. For example, each message may include an identifier. The identifier may be, e.g., a unique address corresponding to an individual module 102, or an identifier corresponding to the plurality of modules. The identifier may correspond to the module(s) that are to receive the message and/or may be requested to respond to the message. For example, a command may include an instruction to store the unique address and the unique address may then be used to access the module. Data may include the unique address to be assigned to the module 102. A command may include other instructions as are evident those skilled in the art. Each module 102 includes a controller 112 and memory 116. Each module 102 may include an initial address 114, set, for example, at manufacturing or prior to coupling the module 102 to the bus 106. The initial address 114 may correspond to a default module identifier. The initial address 114 may be stored in memory 116 and/or may be provided in circuitry as is evident to one skilled in the art. Each module 102 may include a plurality of ports. The plurality of ports may include at least one bus port and a plurality of configuration ports. For example, the bus port(s) may include a bus input port, "Bus In", and a bus output port, "Bus Out". The configuration ports may include a first configuration port, En_In, and a second configuration port, En_Out. The first configuration port, En_In, is configured to receive an input indicating whether address assignment is enabled or disabled for the module 102, as described herein. The second configuration port, En_Out, is configured to provide an output indicating whether address assignment is enabled or disabled for a second module, as described herein.

The controller 112 is configured to be coupled to bus 106 and to communicate with the CMU 104 via bus 106. For example, the controller 112 may be coupled to the bus 106 via bus ports Bus In and Bus Out. The controller may send messages via port Bus Out and may receive messages via port Bus In. The CMU 104 is configured to assign a unique address to each module. The controller 112 is configured to receive the unique address 118 for the module 102 from the CMU 104 and may store the unique address 118 in memory 116. After a plurality of modules 102 have each been assigned a unique address, the CMU 104 may transmit message(s) including the unique address corresponding to the module that is to receive the message(s). Each controller 112 may then receive message(s) from the CMU 104 and may respond only to message(s) that are directed to its unique address. In other words, each module 102 may be assigned a unique address relative to each other module coupled to the bus 106.

The memory 116 is configured to store the unique module address 118. The controller 112 is configured to access the memory 116 to store or read the unique module address 118. For example, the controller 112 may read the module address to determine whether a message received on the Bus In port is meant for the module 102 associated with the controller 112. If the unique module address 118 has not been stored in the memory 116, the controller 112 may be configured to read the initial address 114 to determine the module identifier.

The first configuration port En_In is configured to receive an input indicating whether address assignment is enabled or disabled for the module 102. When address assignment is enabled, the module 102 may receive and store a unique address. The controller 112 is configured to read the En_In port to determine whether address assignment is enabled or disabled for the module 102. For example, a logic 1 may correspond to enabled and a logic 0 may correspond to disabled. For example, the logic 1 may correspond to a first voltage and the logic 0 may correspond to a second voltage. A first configuration state 120 corresponds to the input received at the first configuration port En_In. In other words, the controller may read the first configuration state to determine whether address assignment is enabled or disabled. The first configuration state 120 may have two possible values. The first value corresponds to enabled signifying address assignment is enabled for the module 102. The second value corresponds to disabled signifying address assignment is disabled for the module 102.

The second configuration port En_Out is configured to provide an output indicating whether address assignment is enabled or disabled for a second module. The controller 112 is configured to provide the output to the second configuration port En_Out. Similar to the first configuration port En_In, a logic 1 may correspond to address assignment enabled and a logic zero may correspond to address assignment disabled. A second configuration state 122 may correspond to the value provided to the second configuration port En_Out. In other words, the controller 112 may set the second configuration state to indicate enabled or disabled for address assignment in the second module. The second configuration state 122 may have two possible values. The first value corresponds to enabled signifying address assignment is enabled for the second module. The second value corresponds to disabled signifying address assignment is disabled for the second module.

The input received on the first configuration port En_In for a module 102 may be provided by another module or may be provided by the CMU 104. For example, the CMU 104 may provide a signal to the first configuration port En_In of Module 1 to enable or disable address assignment for Module 1. The CMU may not utilize the bus 106 for providing this signal. The CMU may be coupled to the first configuration port En_In of Module 1 in order to provide this signal. The controller 112 of Module 1 may then read port En_In of Module 1 to determine the first configuration state 120 of Module 1, i.e., to determine whether address assignment is enabled or disabled for Module 1. If address assignment is enabled, Module 1 is configured to receive and store a unique address from CMU 104, via bus 106, as described herein.

The controller 112 of Module 1 may provide the second configuration state 122 to the second configuration port En_Out of Module 1, indicating whether address assignment is enabled or disabled for Module 2. In this example, the second configuration port En_Out of Module 1 is coupled to the first configuration port En_In of Module 2. The controller 112 of Module 2 may then read the first configuration port En_In of Module 2 to determine whether address assignment is enabled or disabled for Module 2. If address assignment is enabled for Module 2, Module 2 is configured to receive and store a unique address from CMU 104, via bus 106, as described herein.

Accordingly, each module 102 is configured to communicate with the CMU and each other module 102 via bus 106. Each module 102 is further coupled to at least one other module. The module to module coupling is configured to enable or disable address assignment in the modules. "First module" and "second module" as used herein correspond to any two modules where a second configuration port of the first module is coupled to a first configuration port of the second module. The unique address may be provided from the CMU 104 to the module 102 via the bus 106.

Figure 2:
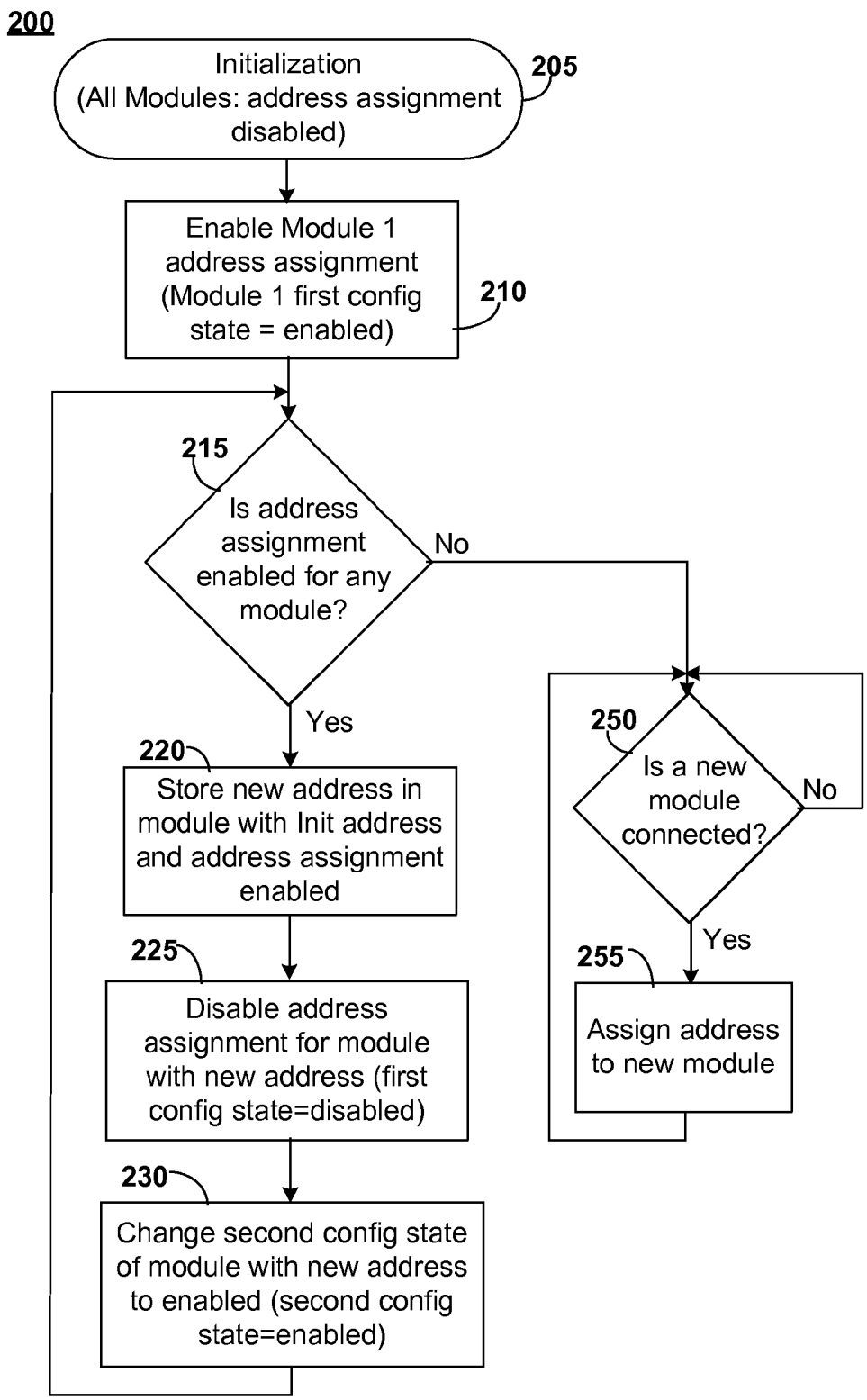
FIG. 2 depicts a flowchart of exemplary operations for assigning addresses to a plurality of modules coupled to a bus, consistent with the present disclosure.

FIG. 2 depicts a flowchart 200 of exemplary operations for assigning addresses to a plurality of modules consistent with the present disclosure. For example, the address may have a value between 000 and FFF, where these values are hexadecimal. Program flow may begin at initialization 205. It is assumed that at initialization 205, the plurality of modules is coupled to each other, bus 106 and CMU 104, as depicted, for example, in FIG. 1. It is further assumed that each module 102 has the initial default address 114. Each module 102 is configured, at initialization, with address assignment disabled. For example, CMU 104 may transmit a message to the initial default address with a command to disable second module address assignment and may provide an address assignment disabled signal to the first configuration port En_In of Module 1. Accordingly, at the completion of operation 205, for each module 102, the first configuration state 120 is zero (i.e., disabled) and the second configuration state 122 is zero (i.e., disabled).

Operation 210 may include enabling address assignment for a first module, e.g., Module 1. For example, the CMU 104 may enable address assignment for Module 1 by setting first configuration state 120 of Module 1 to a value corresponding to enabled, e.g. one. For example, the CMU 104 may provide a signal indicating address assignment enabled to the first configuration port En_In of Module 1.

Whether any module has address assignment enabled may be determined at operation 215. For example, the CMU 104 may broadcast a message to all modules, requesting a response from a module with first configuration state 120 of enabled. Initially, the address of each module 102 is the initial address 114. The message may be transmitted to modules with the initial address or may be broadcast to all modules using an address corresponding to all modules, as is known to those skilled in the art. If a module has address assignment enabled, at operation 220, a new (unique) address may be stored in the module with the initial (default) address that also has address assignment enabled. For example, Module 1 may be the first module assigned a unique address based, at least in part, on having address assignment enabled for Module 1 by the CMU 104.

At operation 225, address assignment may be disabled for the module that was assigned the new address at operation 220. For example, for Module 1, the CMU 104 may set first configuration state 120 to disabled. In other words, the CMU 104 may provide a signal to the first configuration port En_In of Module 1 indicating address assignment disabled for Module 1.

At operation 230 a second module, e.g., Module 2, may be enabled for address assignment. For example, the CMU 104 may provide a message to the module that was assigned a new address at operation 220 (first module, e.g., Module 1) to change its second configuration state to enabled. In other words, the CMU 104 may provide a message to the controller 112 of the module with the new address (first module) to set the value of its second configuration state to enabled. The second configuration state corresponds to an output on the second configuration port of the first module. This value may then be received by the first configuration port En_In of the second module when the first configuration port En_In of the second module is coupled to the second configuration port En_Out of the first module (that was assigned the new unique address at operation 220). As a result, address assignment may be enabled in the second module.

Program flow may then proceed to operation 215 to determine if any module 102 has address assignment enabled. Operations 215, 220, 225 and 230 may be repeated until each module coupled to the CMU 104 via bus 106 has been assigned a unique address.

For example, referring to FIG. 1 and FIG. 2, address assignment may proceed as follows. Initially, address assignment for each module 102 may be disabled and the identifier associated with each module 102 may be the initial address 114. The CMU 104 may enable address assignment for Module 1 by providing a signal indicating enable address assignment to the first configuration port En_In of Module 1. The CMU may then provide a new unique address to controller 112 of Module 1 and the controller 112 may store the new unique address 118 in memory 116, e.g., in response to a message from the CMU 104. The controller 112 may be configured to recognize the new address as the identifier for Module 1. The CMU 104 may then disable address assignment for Module 1, e.g., by sending a message directed to the module with the new address, i.e., Module 1. The CMU may then send a message to Module 1 to enable address assignment for a second module. Module 1 may then enable address assignment for Module 2, for example, based on the message from CMU 104. In response to the message, the controller 112 of Module 1 may change the second configuration state of Module 1 to enabled resulting in a value indicating enabled on the second configuration port En_Out of Module 1 and, thereby, the value indicating enabled on the first configuration port En_In of Module 2. The CMU may then provide a new unique address to controller 112 of Module 2. The controller 112 of Module 2 may store the new address 118 in memory 116 based, at least in part, on the value indicating enabled on the first configuration port En_In of Module 2 that corresponds to the first configuration state of Module 2. The controller 112 may be configured to recognize the new address as the identifier for Module 2. The CMU 104 may then disable address assignment for Module 2 by, for example, sending a message to Module 1, using Module 1's unique address, to set the second configuration state of Module 1 to disabled. This process may be repeated until each module coupled to the CMU via bus 106 has been assigned a new address. In this manner, new unique addresses may be assigned to a plurality of modules coupled to a bus and each module coupled to at least one other module, as described herein.

Referring again to FIG. 2, after each of the modules initially coupled to the bus 106 and CMU 104 has been assigned a new, unique address, whether an additional "new" module is coupled to the bus 106 may be determined at operation 250. If a new module is detected, an address may be assigned to the new module at operation 255. For example, the new module may be coupled to bus 106 and coupled to Module n. Module n may be understood as the last module to be assigned an address during operations 215, 220, 225 and 230. In other words, the second configuration port En_Out of Module n may be coupled to the first configuration port En_In of the new module. The address of Module n may be known by the CMU 104 and the address of the new module may be the initial address. The CMU may then send a message to Module n to enable address assignment for another module. Module n may then enable address assignment in the new module, for example, based on the message from the CMU 104. The CMU 104 may then provide a message to the new module with the initial address and address assignment enabled to store a new address. The new module may then store the new address based, at least in part, on the message from the CMU 104 and the first configuration state of the new module which corresponds to the second configuration state of Module n. Program flow may then return to operation 250, determining whether another new module has been connected to bus 106.

Advantageously, common modules may be manufactured, each with the initial address. These modules may then be coupled to each other and a CMU via a bus prior to assigning a unique address to each module. A unique address may then be assigned to each module. New module(s) may then be coupled to the bus and another module. A unique address may then be assigned to each new module providing the ability to "hot swap" modules.

Of course, while FIG. 2 depicts exemplary operations according to some embodiments, it is to be understood that in other embodiments all of the operations depicted in FIG. 2 may not be necessary. Indeed, it is fully contemplated herein that other embodiments of the present disclosure may include sub-combinations of the operations depicted in FIG. 2 and/or additional operations. Thus, claims directed to features and/or operations that are not exactly shown in one drawing are deemed within the scope and content of the present disclosure.

Memory 116 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 116 may comprise other and/or later-developed types of computer-readable memory.

Embodiments of the methods described herein may be implemented using a processor and/or other programmable device. To that end, the methods described herein may be implemented on a tangible computer readable medium having instructions stored thereon that when executed by one or more processors perform the methods. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Unless specifically stated otherwise, as apparent from the preceding discussions, it is appreciated that throughout the specification discussions utilizing terms such as "operations," "processing," "computing," "calculating," "determining," or the like, refer to the action and/or processes of a computer or computing system, or similar electronic computing device or apparatus, that manipulate and/or transform data represented as physical, such as electronic, quantities within the computing system's registers and/or memories into other data similarly represented as physical quantities within the computing system's memories, registers or other such information storage, transmission or display devices.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
a first module comprising:
at least one bus port configured to couple the first module to a bus;
a first configuration port configured to receive an input indicating whether address assignment is enabled or disabled for the first module;
a second configuration port configured to provide an output indicating whether address assignment is enabled or disabled for a second module;
a memory configured to store a unique address, wherein the unique address is configured to identify the first module; and
a controller coupled to a central management unit (CMU) via the bus and configured to
receive the unique address from the CMU,
determine whether address assignment is enabled for the first module,
store the unique address in the memory if address assignment is enabled for the first module, and
enable or disable address assignment for a second module based on a message received from the CMU, by setting a configuration state of the first module when the second module is coupled to the second configuration port of the first module, wherein
the message is sent from the CMU to the first module to cause the first module to enable or disable address assignment for the second module, and
the first module is configured to provide an output on the configuration state of the first module indicating address assignment is enabled or disabled for the second module based on the received message.

2. The apparatus of claim 1, wherein the first module is configured to receive the input indicating whether address assignment is enabled or disabled for the first module from another module.

3. The apparatus of claim 1, wherein the first module is configured to receive the input indicating whether address assignment is enabled or disabled for the first module from the CMU.

4. The apparatus of claim 1, wherein the controller is configured to determine whether address assignment is enabled for the first module based on a first configuration state of the first module, the first configuration state being based on the input indicating whether address assignment is enabled or disabled.

5. The apparatus of claim 1, wherein the first module further comprises an initial address.

6. A method for assigning unique addresses to a plurality of modules, the method comprising:
disabling address assignment for the plurality of modules, wherein the plurality of modules are coupled to a bus, the plurality of modules comprises a first module coupled to a second module, and the plurality of modules are identified by an initial address;

enabling address assignment for the first module, wherein enabling address assignment for the first module comprises receiving an input from a central management unit (CMU) coupled to the bus on a first configuration port of the first module indicating that address assignment is enabled for the first module;

storing a new address in the first module;

disabling address assignment for the first module;

enabling address assignment for the second module, wherein enabling address assignment for the second module comprises receiving a message from the CMU on a bus port of the first module, setting a configuration state of the first module when the second module is coupled to a second configuration port of the first module, and providing an output on the second configuration port of the first module indicating address assignment is enabled for the second module based on the received message; and disabling address assignment for the second module, wherein disabling address assignment for the second module comprises receiving the message from the CMU on the bus port of the first module, setting the configuration state of the first module when the second module is coupled to the second configuration port of the first module, and providing the output on the second configuration port of the first module indicating address assignment is disabled for the second module based on the received message, wherein the message is sent from the CMU to the first module to cause the first module to enable or disable address assignment for the second module.

7. The method of claim 6, wherein the new address is provided to the first module by the CMU coupled to the bus.

8. The method of claim 6, further comprising determining whether address assignment is enabled in one of the plurality of modules.

9. The method of claim 6, further comprising determining whether a new module has been coupled to the bus.

10. The method of claim 9, further comprising assigning a new address to the new module if the new module is coupled to the bus and the new module is coupled to one module of the plurality of modules.

11. A system comprising:
a plurality of modules coupled to a bus, the plurality of modules comprising a first module coupled to a second module, the first module comprising:
at least one bus port configured to couple the first module to the bus;
a first configuration port configured to receive an input indicating whether address assignment is enabled or disabled for the first module;
a second configuration port configured to provide an output indicating whether address assignment is enabled or disabled for a second module;
a memory configured to store a unique address, wherein the unique address is configured to identify the first module; and
a controller configured to
receive the unique address,
determine whether address assignment is enabled for the first module,
store the unique address in the memory if address assignment is enabled for the first module, and
enable or disable address assignment for the second module by setting a configuration state of the first module when the second module is coupled to the second configuration port of the first module; and
a central management unit (CMU) coupled to the bus and configured to provide the unique address and a message to the controller, wherein
the message is sent from the CMU to the first module to cause the first module to enable or disable address assignment for the second module, and
the first module is configured to provide an output on the configuration state of the first module indicating address assignment is enabled or disabled for the second module based on the received message.

12. The system of claim 11, further comprising a new module coupled to the bus and to one of the plurality of modules, wherein the CMU is further configured to detect the new module.

13. The system of claim 12, wherein the CMU is further configured to assign a new unique address to the new module.

14. The system of claim 12, wherein
the CMU is configured to send a message to one module to cause the one module to enable or disable address assignment in the new module,
the CMU is further configured to provide a new unique address to the new module, and
the new module is configured to receive and store the new unique address if address assignment is enabled in the new module.

15. The system of claim 11, wherein the CMU is configured to provide the input indicating whether address assignment is enabled or disabled in the first module.

16. The system of claim 11, wherein another module is configured to provide the input indicating whether address assignment is enabled or disabled in the first module.

17. The system of claim 11, wherein the controller is configured to determine whether address assignment is enabled or disabled for the first module based on a first configuration state in the first module, the first configuration state being based on the input indicating whether address assignment is enabled or disabled.

18. The system of claim 11, wherein the plurality of modules comprise an initial address.

* * * * *